United States Patent
Krock et al.

(10) Patent No.: US 9,723,091 B1
(45) Date of Patent: Aug. 1, 2017

(54) VARIABLE LENGTH PROTOCOL USING SERIALIZED PAYLOAD WITH COMPRESSION SUPPORT

(71) Applicant: Noble Systems Corporation, Atlanta, GA (US)

(72) Inventors: Andrew Michael Krock, Cummings, GA (US); Michael Christopher Frances Goodwin, Ackworth, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 538 days.

(21) Appl. No.: 13/672,950

(22) Filed: Nov. 9, 2012

(51) Int. Cl.
*G06F 15/16* (2006.01)
*H04L 29/08* (2006.01)

(52) U.S. Cl.
CPC .................................. *H04L 67/24* (2013.01)

(58) Field of Classification Search
CPC ....................................................... H04L 69/16
USPC ............................................................ 709/203
See application file for complete search history.

(56) References Cited

U.S. PATENT DOCUMENTS

| | | | | |
|---|---|---|---|---|
| 6,230,004 B1* | 5/2001 | Hall | ........................ | H04W 4/00 455/414.2 |
| 6,273,622 B1* | 8/2001 | Ben-David | .................... | 709/230 |
| 6,356,591 B1* | 3/2002 | Kagawa | ............. | H04N 21/4347 375/240.26 |
| 6,356,951 B1* | 3/2002 | Gentry, Jr. | .................... | 709/250 |
| 6,480,507 B1 | 11/2002 | Mercer et al. | | |
| 6,483,805 B1* | 11/2002 | Davies et al. | ................. | 370/235 |
| 6,522,654 B1* | 2/2003 | Small | ........................... | 370/400 |
| 6,618,397 B1* | 9/2003 | Huang | .................... | H04L 29/06 370/392 |
| 6,651,099 B1* | 11/2003 | Dietz et al. | .................... | 709/224 |
| 6,665,725 B1* | 12/2003 | Dietz et al. | .................... | 709/230 |
| 7,100,171 B1* | 8/2006 | Kaluskar et al. | ............. | 719/330 |
| 7,331,049 B1* | 2/2008 | Jin | ........................ | G06Q 10/107 709/201 |
| 7,539,777 B1* | 5/2009 | Aitken | .......................... | 709/248 |
| 7,558,873 B1* | 7/2009 | Maufer | ......................... | 709/237 |

(Continued)

OTHER PUBLICATIONS

"The application/json Media Type for JavaScript Object Notation (JSON)," Crockford, D., Network Working Group, Jul. 2006.

*Primary Examiner* — Kevin Bates
*Assistant Examiner* — Clarence McCray (57) ABSTRACT

Various embodiments of the invention provide methods, systems, and computer program products for generating a remote procedure call message configured to be transmitted from a first device over a communication network to a remote second device. In various embodiments, the remote procedure call message includes: (1) a command header field that comprises a first value indicating a command type; (2) a payload length header field that comprises a second value indicating an uncompressed size of a serialized representation of a command structure; (3) a payload compressed length header field that comprises a third value indicating a compressed size of the serialized representation of the command structure; (4) a checksum header field that comprises a fourth value configured to enable detection of corrupted data being received by the remote server device; and (5) a payload field that comprises the serialized representation of the command structure.

24 Claims, 5 Drawing Sheets

(56) References Cited

U.S. PATENT DOCUMENTS

| | | | |
|---|---|---|---|
| 7,594,022 B2* | 9/2009 | Warren | H04L 51/30 709/227 |
| 7,647,552 B2* | 1/2010 | Wan | 715/234 |
| 8,239,421 B1* | 8/2012 | Marwah et al. | 707/802 |
| 8,595,188 B2* | 11/2013 | Gruhl et al. | 707/646 |
| 8,627,071 B1* | 1/2014 | Corbett | H04L 9/3242 713/168 |
| 2003/0023628 A1* | 1/2003 | Girardot et al. | 707/513 |
| 2003/0105858 A1* | 6/2003 | Hogg | G06F 17/3048 709/224 |
| 2003/0225889 A1* | 12/2003 | Moutafov | 709/227 |
| 2004/0042470 A1* | 3/2004 | Cooper | H04L 12/2602 370/401 |
| 2004/0098478 A1* | 5/2004 | Koetke et al. | 709/224 |
| 2004/0117602 A1* | 6/2004 | Tripathy | H04L 29/06 712/225 |
| 2004/0255048 A1* | 12/2004 | Lev Ran et al. | 709/249 |
| 2005/0005093 A1* | 1/2005 | Bartels et al. | 713/150 |
| 2005/0182800 A1* | 8/2005 | Ashwin et al. | 707/203 |
| 2005/0273792 A1* | 12/2005 | Inohara | G06F 9/548 719/330 |
| 2006/0031407 A1* | 2/2006 | Dispensa | H04L 29/12009 709/219 |
| 2006/0090195 A1* | 4/2006 | Pearson | H04L 67/02 726/3 |
| 2006/0123079 A1* | 6/2006 | Sturniolo et al. | 709/203 |
| 2006/0155814 A1* | 7/2006 | Bennett et al. | 709/207 |
| 2006/0173848 A1* | 8/2006 | Peterson | G06F 17/30153 |
| 2006/0235992 A1* | 10/2006 | Matias et al. | 709/236 |
| 2007/0242683 A1* | 10/2007 | Pelletier et al. | 370/401 |
| 2008/0043684 A1 | 2/2008 | Hovey | |
| 2010/0199291 A1* | 8/2010 | Wang | G06F 9/547 719/330 |
| 2010/0325181 A1* | 12/2010 | Skillcorn | 707/829 |
| 2011/0145789 A1* | 6/2011 | Rasch | G06F 9/44505 717/121 |
| 2011/0153780 A1* | 6/2011 | Rao et al. | 709/219 |
| 2011/0285556 A1* | 11/2011 | Nov | 341/51 |
| 2012/0167063 A1 | 6/2012 | Detwiler et al. | |
| 2012/0209887 A1* | 8/2012 | Jones et al. | 707/802 |
| 2012/0209951 A1* | 8/2012 | Enns et al. | 709/217 |
| 2013/0036451 A1* | 2/2013 | Fausak | H04L 67/42 726/3 |
| 2013/0060837 A1* | 3/2013 | Chakraborty et al. | 709/203 |
| 2014/0026057 A1* | 1/2014 | Kimpton et al. | 715/733 |
| 2014/0070966 A1* | 3/2014 | Fablet et al. | 341/55 |
| 2014/0130063 A1* | 5/2014 | Barrett | H04L 67/40 719/313 |

\* cited by examiner

VARIABLE LENGTH PROTOCOL USING SERIALIZED PAYLOAD WITH COMPRESSION SUPPORT

BACKGROUND

In general, a communication protocol is a system of digital message formats and rules for exchanging messages between computer systems. For example, a protocol may include signaling, authentication, and error detection and correction capabilities, and may define the syntax, semantics, and synchronization of communication between computer systems.

One type of communication that is frequently exchanged between computer systems is a remote procedure call (RPC). Typically, a RPC is an inter-process communication that allows a computer program, such as a client application, running on one computer system to cause another computer program, such as a server application, subroutine, or procedure, to execute on a second remote computer system over a network. There are several types of communication protocols available that provide support for RPCs. For instance, Microsoft's® .NET environment provides .NET Remoting and .NET Windows Communication Framework (WCF) for communicating RPCs. However, the use of .NET Remoting is limited because the applications (e.g., server application and client application) running on the two computer systems must be .NET applications. In addition, .NET Remoting does not provide bi-directional communication using duplex sockets and requires the server application to establish a "callback" socket to the client application across a different port. Further, although .NET WCF provides full duplex communications, .NET WCF is still limited to consumption by .NET languages.

Another type of protocol available that provides support for RPCs is a fixed-length field protocol. This type of protocol has a fixed length for each field in the message exchanged between the two applications (e.g., server application and client application). Thus, a drawback of this type of protocol is the server and client applications must be in strict agreement on the length of each field and the number of fields in each message. Such requirements reduce the flexibility of this protocol because new fields cannot be easily added or existing fields modified by either the server or client application without first obtaining support by the other side. Further, because the message structure has a fixed number of fields with fixed positions and length, whether data is present for a particular field or not, the message still consumes the same number of bytes and cannot adjust to a smaller number of bytes (e.g., smaller size) when a particular field does not contain data. Likewise, similar limitations are found with respect to binary protocols.

Finally, another type of protocol available that provides support for RPC's is a character delimited protocol. This type of protocol allows for variable length fields that are separated by a predetermined character delimiter such as the TAB character. However, although this type of protocol does not have a concept of message length and a message exchanged between applications (e.g., server application and client application) can vary in size the server and client applications are typically required to read a message until a delimiter is hit to establish data for a particular field in the message and to establish the message's boundary. Thus, if the delimiters are not correctly placed in the message with respect to number and position, the server and/or client applications may become quite confused reading the message. In addition, similar to a fixed-length protocol, the server and client applications must be in strict agreement on the number and order of the fields found in the message. As a result, the flexibility found in this type of protocol is typically limited.

Thus, a need in the art exists for a more flexible communication protocol that may be used to exchange messages such as RPCs. More specifically, a need in the art exists for a communication protocol that supports the exchange of messages between applications that are not language specific and allows a variable payload for the message. It is with respect to these considerations and others that the disclosure herein is presented.

BRIEF SUMMARY

In general, embodiments of the present invention provide computer program products, methods, systems, apparatus, and computing entities for generating a remote procedure call message configured to be transmitted from a first device over a communication network to a remote second device. In various embodiments, the remote procedure call message includes: (1) a command header field that comprises a first value indicating a command type; (2) a payload length header field that comprises a second value indicating an uncompressed size of a serialized representation of a command structure; (3) a payload compressed length header field that comprises a third value indicating a compressed size of the serialized representation of the command structure; (4) a checksum header field that comprises a fourth value configured to enable detection of corrupted data being received by the remote server device; and (5) a payload field that comprises the serialized representation of the command structure. In particular embodiments, the serialized representation of the command structure is a JavaScript Object Notation (JSON) representation or an Extensible Markup Language (XML) representation of the command structure. Further, depending on the embodiment, the first value for command header field, the second value for payload length header field, and the third value for the payload compressed length header field may be of varying sizes and data types such as, for example, a size of four bytes and a data type of integer.

In particular embodiments, the remote procedure call message is generated by combining together the first value for the command header field, the second value for the payload length header field, the third value for the payload compressed length header field, the fourth value for checksum header field, and the serialized representation of the command structure for the payload field. In addition, depending on the embodiment, the command structure may be free form and may not be limited to a given layout. Further, the command structure is generally configured to be parsed and executed by a procedure residing on the remote second device.

In particular embodiments, the communication network is configured with a protocol stack comprising a data link layer, a network layer, a transport layer, and an application layer, and the application layer comprises the remote procedure call message as a sub-layer. In particular instances, the protocol stack is one from the group consisting of a TCP/IP protocol stack, a UPD protocol stack, and an OSI protocol stack.

In addition, in particular embodiments, the step of generating the fourth value for the checksum header field is performed by hashing the first value for the command header field, the second value for the payload length header field, and the third value for the payload compressed length header field based on a MD5 message-digest algorithm. Further, in particular embodiments, the serialized representation of the command structure is compressed in response to an uncompressed length of the serialized representation of the command structure being greater than a predetermined size. Depending on the embodiment, the compression of the serialized representation of the command structure may be accomplished using gzip or LZMA.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary System Network Architecture

Figure 1:
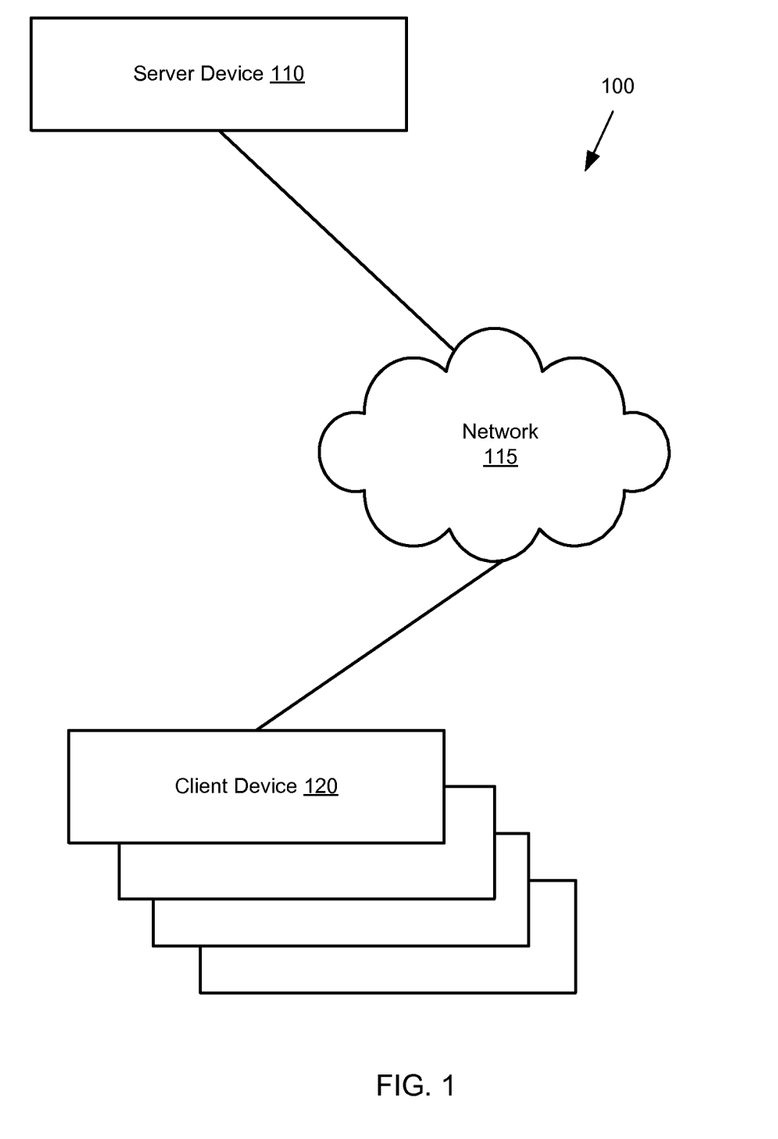
FIG. 1 shows one embodiment of a system network architecture that may be used in conjunction with the various technologies disclosed herein.

FIG. 1 shows one embodiment of a system network architecture 100 that may be used in conjunction with the various technologies disclosed herein. The system network architecture 100 shown in FIG. 1 includes a server device 110, a network 115, and one or more client devices 120.

However, it should be understood that depending on the embodiment the system network architecture 100 may exclude one or more of the server device 110 and/or client devices 120 and/or may include one or more other components such as, for example, multiple server devices 110, storage media, printing devices, routers, etc. Thus, the system network architecture 100 shown in FIG. 1 is for purposes of explaining the various embodiments of the invention as is discussed below and should not be construed to limit the scope of the invention.

For purposes of explaining the various embodiments of the invention, the server device 110 and client devices 120 shown in FIG. 1 are in a client/server relationship. That is, the server device 110 operates server-based services that support one or more applications that may reside on the client devices 120. For example, the server device 110 in particular embodiments may include information lookup services for an application residing on one or more of the client devices 120. During execution, the application residing on a particular client device 120 may send a request to the server device 110 for certain information that is provided by the information lookup services residing on the server device 110. However, it should be understood that such a relationship does not need to exist to practice various embodiments of the invention in all instances. Further, it should be understood that although the server device 110 is depicted as a single entity in FIG. 1, the functions of the server device 110 may be spread over multiple computing devices, computing clusters, or data centers, and the components of the server device 110 may reside in multiple geographic locations.

The server device 110 communicates with the one or more client devices 120 over a network 115. Depending on the embodiment, this network 115 may comprise any type of known network such as a land area network (LAN), wireless land area network (WLAN), wide area network (WAN), metropolitan area network (MAN), wireless communication network, the Internet, etc., or combination thereof. In addition, this network 115 may comprise any combination of standard communication technologies and protocols. For example, communications may be carried over the network 115 by link technologies such as Ethernet, 802.11, CDMA, 3G, 4G, or digital subscriber line (DSL). Further, the network 115 may support a plurality of networking protocols, including the hypertext transfer protocol (HTTP), the transmission control protocol/internet protocol (TCP/IP), or the file transfer protocol (FTP), and the data transferred over the network 115 may be encrypted using technologies such as, for example, transport layer security (TLS), secure sockets layer (SSL), and internet protocol security (IPsec).

Figure 2:
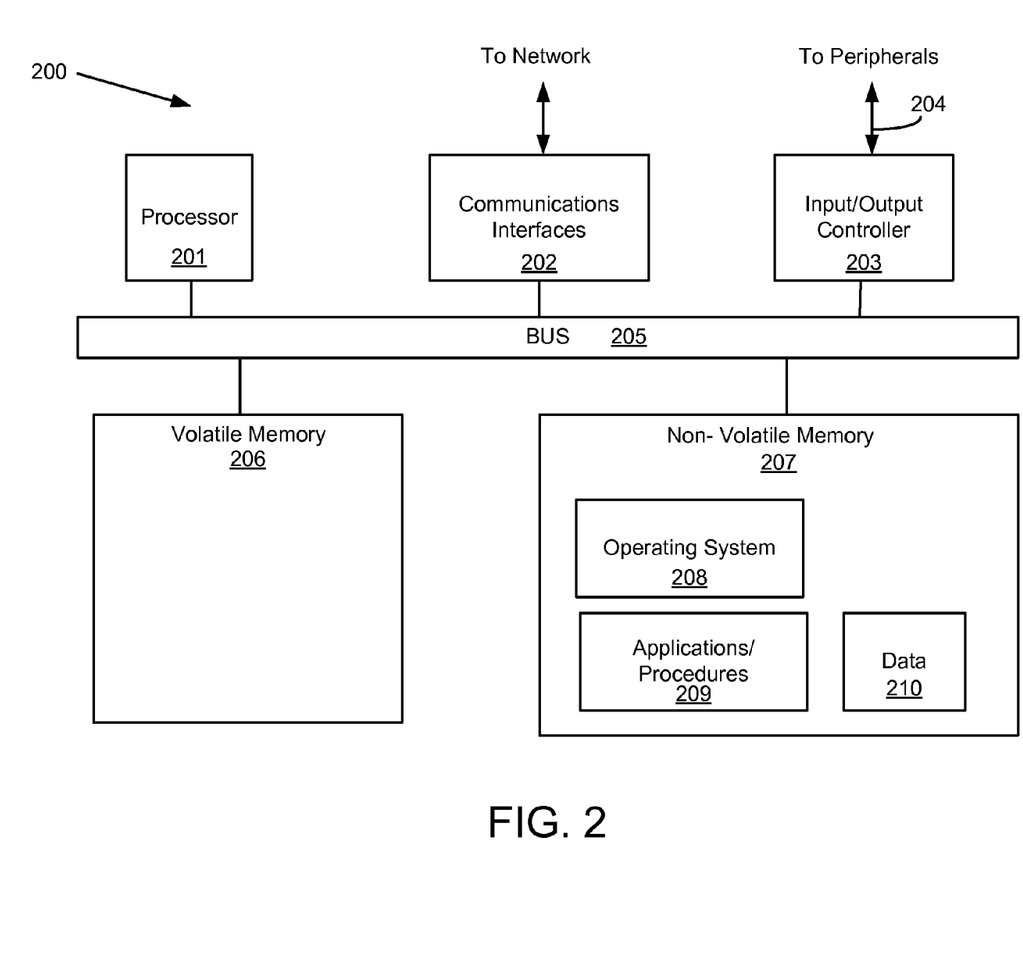
FIG. 2 is an exemplary schematic diagram of a system used in one embodiment of the system network architecture to practice the technologies disclosed herein.

FIG. 2 is an exemplary schematic diagram of a processing system 200 that may be used in an embodiment of the system network architecture 100 to practice the technologies disclosed herein such as, for example, the server device 110 and/or client devices 120. In general, the term "processing system" may be exemplified by, for example, but without limitation: a personal computer, server, desktop computer, tablets, smart phones, personal digital assistants (PDA), notebooks, laptops, distributed systems, servers, blades, gateways, switches, and the like, as well as any combination of devices or entities adapted to perform the functions described herein.

Shown in FIG. 2, the processing system 200 may include one or more processors 201 that may communicate with other elements within the processing system 200 via a bus 205. The processor 201 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 200 may also include one or more communications interfaces 202 for communicating data via a network with various external devices, such as other components of FIG. 1. As previously mentioned, depending on the embodiment, communication may be via wired, optical, or wireless networks (or a combination thereof). In addition, as previously mentioned, the communication may use a variety of data transmission protocols, such as fiber distributed data interface (FDDI), Ethernet, asynchronous transfer mode ("ATM"), or frame relay.

The input/output controller 203 may also communicate with one or more input devices or peripherals using an interface 204, such as, but not limited to: a keyboard, a mouse, a touch screen/display input, microphone, pointing device, etc. The input/output controller 203 may also communicate with output devices or peripherals, such as displays, printers, speakers, headsets, banner displays, etc.

The processor 201 may be configured to execute instructions stored in volatile memory 206, non-volatile memory 207, or other forms of computer-readable storage media accessible to the processor 201. The volatile memory 206 may comprise various types of memory technologies, including, but not limited to: random access memory ("RAM"), dynamic random access memory ("DRAM"), static random access memory ("SRAM"), and other forms well known to those skilled in the art. The non-volatile memory 207 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 207 may store program code and data, which also may be loaded into the volatile memory 206 at execution time. Specifically, the non-volatile memory 207 may store one or more computer program applications and procedures 209 (e.g., functions, routines, and/or subroutines), and/or operating system code 208 containing instructions for performing the process and/or functions associated with the technologies disclosed herein. These applications and procedures 209 may also access, generate, or store data 210 in the non-volatile memory 207, as well as in the volatile memory 206. The volatile memory 206 and/or non-volatile memory 207 may be used to store other information including, but not limited to: records, applications, programs, scripts, source code, object code, byte code, compiled code, interpreted code, machine code, executable instructions, or the like. These may be executed or processed by, for example, the processor 201. These may form a part of, or may interact with, the applications and procedures 209.

The technologies described herein may be implemented in various ways, including as computer program products comprising memory storing instructions causing a processor to perform the operations associated with the above technologies. The computer program product may comprise a tangible non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

General Overview of Protocol Suite and Message Structure

Figure 3:
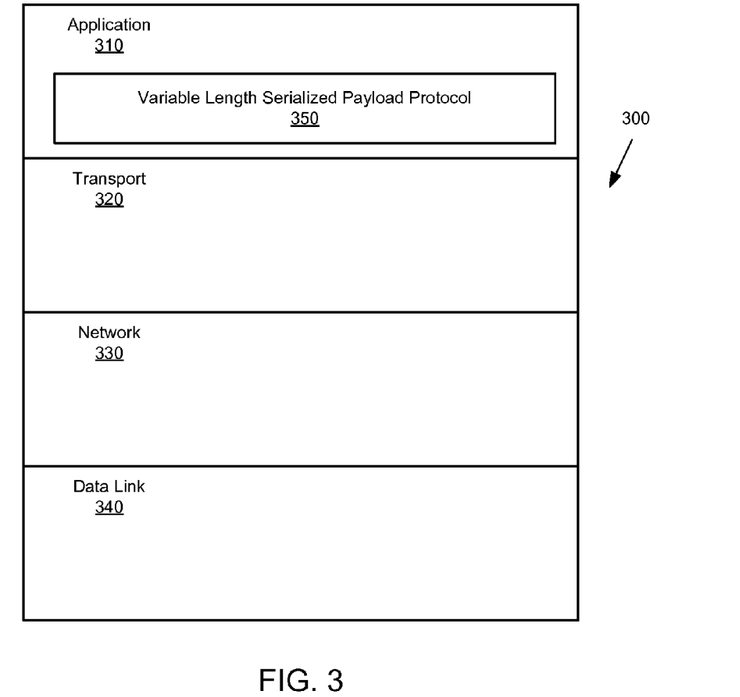
FIG. 3 is a block diagram depicting the multiple layers of a TCP/IP protocol suite that may be utilized to provide network communication in accordance with various embodiments of the present invention.

FIG. 3 provides a block diagram depicting the multiple layers of a TCP/IP protocol suite 300 (which may be referred to as a TCP/IP stack) that may be utilized to provide network communication in accordance with various embodiments of the present invention. The TCP/IP protocol suite 300 is generally comprised of four separate layers and includes the basic set of communications protocols on which the Internet and most commercial networks run. Each of the layers is designed to perform a certain set of tasks or solve a particular set of problems relating to data transmission. In addition, each of the layers only interacts with the layers immediately below and immediately above it. That is, each layer in TCP/IP protocol suite 300 performs services for the adjacent layer directly above it and makes requests of the adjacent layer directly below it. The upper layers in the TCP/IP protocol suite 300 are generally closer to the end user and deal with more abstract data, while those layers lower in the suite (i.e., stack) are generally closer to the hardware and pertain more to issues dealing with actual data transmission.

The TCP/IP protocol suite 300 shown in FIG. 3 is comprised of a data link layer 340, a network layer 330, a transport layer 320, and an application layer 310. However, depending on the embodiment, the suite 300 may comprise any number of different protocol layer combinations known in the art such as those associated with the open system interconnection (OSI) model and the user datagram protocol (UDP) model, for example. Depending on the embodiment, the TCP/IP protocol suite 300 may use an address resolution protocol (ARP), point-to-point protocol (PPP), reverse address resolution protocol (RARP), data link switching client address protocol (DCAP) or similar protocol for the data link layer 340, an Internet protocol (IP), Internet control message protocol (ICMP), Internet group management protocol (IGMP), or similar protocol for the network layer 330, and a transmission control protocol (TCP), user datagram protocol (UDP), or similar protocol for the transport layer 320. Further, the variable length serialized payload protocol 350 disclosed in this application is not limited to use in the application layer 310 of the internet protocol suite 300 and can be used in any appropriate protocol suite, including a TCP/IP stack other than that shown here, a seven-layer OSI model, UDP model, or some other wireless or wireline protocol suite. Because various embodiments of the transport, network, and data line layers 320-340 are generally known in the art, the following description focuses on the application layer 310 and its inclusion of the variable length serialized payload protocol sub-layer 350.

In general, the application layer 310 coordinates communications and manages dialog between two peers, and is somewhat analogous to the combination of the application, presentation, and session layers of a seven-layer OSI model. If data is to be transmitted through a network configured with a TCP/IP protocol suite 300, then the application layer 310 encapsulates the data in a transport layer protocol before passing it along to the transport layer 320.

In the embodiment shown in FIG. 3, the application layer 310 includes the variable length serialized payload protocol sub-layer 350. As is explained in greater detail below, this sub-layer 350 includes a Remote Procedure Call (RPC) messaging pattern that uses a first network node (referred to as a source) to send a request message to a second network node (referred to as a target). For example, in particular instances, the RPC serves as a communication that allows a computer program residing on a first computing device to cause a procedure (e.g., a function, routine, and/or subroutine) residing on a second computing device to execute without the computer program having explicit coding for the details for this remote procedure. For instance, returning to the computer network architecture 100 shown in FIG. 1, one of the client devices 120 may initiate a RPC by sending a request message to the remote server device 110 over the network 115 to have the server device 110 execute a specific procedure. Typically, the remote server device 110 sends a response (that may include information needed by the client device 120 to continue) back to the client device 120 and the client device 120 continues its process.

Thus, in various embodiments, the variable length serialized payload protocol 350 is built on the semantics of synchronous request-reply messaging that generally involves sending a request to obtain a reply in return, and requires that each peer (e.g., the client device 120 and the server device 110) be capable of both sending and receiving messages. However, this may not always be the case and in other embodiments, the variable length serialized payload protocol 350 may involve asynchronous messaging.

Figure 4:
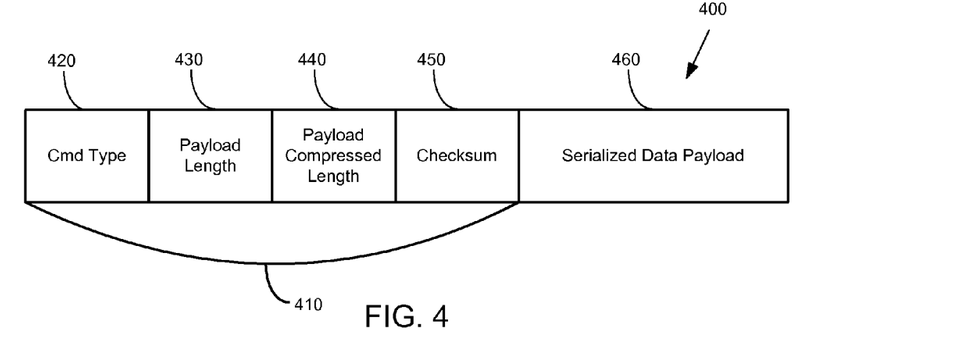
FIG. 4 is a block diagram depicting a message structure in accordance with various embodiments of the present invention.

Turning now to FIG. 4, an embodiment of the message 400 that is sent using the variable length serialized payload protocol 350 is shown. For this embodiment, the message 400 includes a header 410 and a payload 460. The header 410 preferably includes a command header 420 that holds a value defining the command type. Typically, the consumer of the protocol 350 defines the various command types and these types identify what kind of command the consumer is to execute as a result of receiving the message 400. For example, the command types may be defined as performing a lookup in a database, scheduling a service on the remote device, authenticating a password, and/or printing a document. In one embodiment, each command type is assigned an integer and the integer for the corresponding command type is the value that is stored in the command header 420.

In addition, in particular embodiments, the header 410 may include a payload length header 430 that contains a value for determining the uncompressed size of the payload being transmitted in the message 400. For example, the value may be an integer that identifies the number of bytes of the uncompressed payload. Likewise, in particular embodiments, the header 410 may also include a payload compressed length header 440 that contains a value for determining the compressed size of the payload being transmitted in the message 400. Thus, in various embodiments, the variable length serialized payload protocol 350 provides compression support to allow for large payloads to be transmitted. For instance, in one embodiment, compression occurs if the uncompressed length of the payload is greater than a predetermined size (e.g., greater than 300 bytes). For these particular embodiments, compression may be accomplished using a number of different methods such as gzip or LZMA (using the Lempel-Ziv-Markon chain algorithm) for example. Therefore, in particular embodiments, the consumer of the message 400 may determine whether the payload has been compressed or not by whether the payload compressed length header 440 contains a value greater than zero.

Further, in particular embodiments, the header 410 may also include a checksum header 450 that includes a value that is used by the consumer to validate whether or not corrupted data has been received in the message 400. For instance, in one embodiment, the MD5 message-digest algorithm is used to produce a hash value by hashing the command header 420, the payload length header 430, and the payload compressed length header 440. Thus, the consumer of the message 400 may perform the same hashing operation on the three header values upon receiving the message 400 and compare the calculated checksum value with the checksum value stored in the checksum header 450 to determine whether the data received in the message 400 has been corrupted. If so, depending on the embodiment, the consumer may discard the message 400 and/or request for the message 400 to be resent. It should be noted that with respect to using the MD5 checksum, in particular embodiments, the hashing operation may be performed to also include the payload 460. This is because the MD5 algorithm allows for messages of arbitrary length to be provided as input.

As a result of including the header 410 in the variable length serialized payload protocol 350 in various embodiments, the reading and/or parsing of the message is more efficient than would otherwise be achieved without this information provided in the header 410. Furthermore, the information provided in the header 410 also provides the selective compression capability of the payload in various embodiments.

Finally, in particular embodiments, the message 400 includes a payload 460 that provides information needed by the consumer to perform the associated command. That is, in particular embodiments, the payload 460 provides the RPC. Furthermore, in particular embodiments, the payload is serialized. That is, in various embodiments, the content (e.g., data structure or object) of the payload is converted into a format in which every data member is converted into a stream of bytes so that the payload may be transmitted across a network connection and "resurrected" in another computer environment. For instance, in particular embodiments, the payload may be formatted (e.g., serialized) using Extensible Markup Language (XML). XML is a markup language that defines a set of rules for encoding information in a format that is both human-readable and machine-readable. In general, XML was created to structure, store, and transport information and serves as a flexible way to create a common information format for information and to share both the format and the information among applications, independent of the applications' native programming languages. While in other embodiments, the payload may be formatted (e.g., serialized) using JavaScript Object Notation (JSON). JSON is a text-based open standard designed for data interchange and, despite its relationship to JavaScript, is language-independent. To find specific information on the JSON format, see "The application/json Media Type for JavaScript Object Notation (JSON)," Crockford, D., Network Working Group at JSON.org, July 2006, the contents of which are incorporated in their entirety. Thus, the JSON format is readily available for a large variety of programming languages. It should be noted that XML and JSON formats are provided in this disclosure as two examples of serialization formats that may be used for serializing the payload and should not be construed to limit the scope of the invention. That is, in other embodiments of the invention, other types of serialization formats are contemplated for use in serializing the payload.

Accordingly, as a result of serializing the payload, in various embodiments, the message 400 may be configured so that the payload 460 may vary in length and/or with respect to fields that make up the payload in different instances. That is for instance, the payload 460 may be a first size with a first set of fields for a first message 400 sent and a second and different size with a different set of fields for a second message 400 sent. Thus, the variable length serialized payload protocol 350 is configured to transmit messages for a number of different commands and/or to a number of different consumers.

For example, a first message 400 may be sent from a particular client device 120 that requests a remote server device 110 to look up information (e.g., an address) in a database on a particular customer and to return the information to the client device 120. Thus, for the first message 400, the payload 460 may comprise a command that includes the customer's name and telephone number that may be used by the server device 110 to query the database to obtain the information on the customer. Next, a second message 400 may be sent from a different client device 120 requesting the remote server device 110 to verify a password entered by a user on the client device 120. Thus, for the second message 400, the payload 460 may comprise a command that includes the user's name and password. As a result, the lengths and/or fields of the first message 400 and the second message 400 may be different. Furthermore, the messages 400 may be requested by different applications residing on the client devices 120 (e.g., sources) and may be received by different consumers (e.g., targets) on the server device 110. Accordingly, the variable length serialized payload protocol 350 in various embodiments accommodates sending messages 400 of variable size, comprising variable fields, and to different targets.

In addition, as a result of serializing the payload, in various embodiments, the variable length serialized payload protocol 350 may not only be utilized to send messages 400 of variable size, variable fields, and to different targets, but also to send messages 400 from sources and to targets using variable programming languages. For example, in particular instances, the variable length serialized payload protocol 350 may be used to send a message from an application programmed in C# to a remote application programmed in JavaScript, Visual Basic, and/or LotusScript. In these instances, since the payload 460 has been serialized, the JavaScript, Visual Basic, or LotusScript application is able to process the command sent from the C# application. Thus, in these particular embodiments, the variable length serialized payload protocol 350 provides a great deal of flexibility with respect to sending a variety of RPCs to and from a variety of applications programmed in a variety of languages residing on a variety of devices.

Exemplary System Operation

As mentioned, the variable length serialized payload protocol 350 is mainly configured to send RPCs. However, the protocol 350 may be utilized to send other types of messages such as Internet control messages, email, and/or SMS messages. However, with respect to RPCs, these messages 400 primarily are directed to call a procedure (e.g., a function, routine, and/or subroutine) in a remote server program. Typically, the source and the target each have their own address spaces. That is, each has its own memory resource allocated to data used by the procedure.

Figure 5:
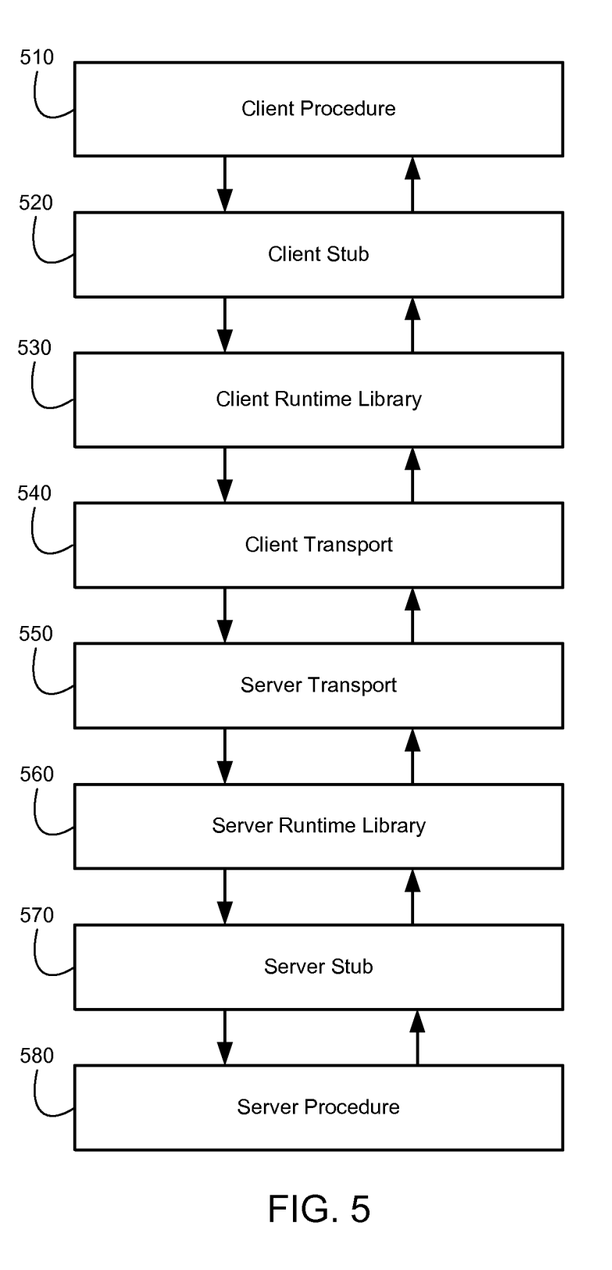
FIG. 5 is a flowchart illustrating various components involved in a remote procedure call in accordance with various embodiments of the present invention.

FIG. 5 provides an embodiment of a RPC architecture. As shown in the figure, a client procedure 510 (e.g., a function, routine, or subroutine) residing on a client device 120 is called to perform some desired procedure. For example, an application (e.g., a computer program) residing on the client device 120 may call the client procedure 510 to query needed information from a database. In this instance, the database resides remotely from the client device 120 and the client device 120 is unable to access the database directly. However, the server device 110 is able to access the database.

In turn, the client procedure 510 calls a local stub 520 instead of executing actual code for performing the desired action (e.g., querying the database). In general, a stub is a piece of code used for converting parameters passed during a RPC. Since the client procedure 510 (e.g., client function, routine, or subroutine) and the remote server procedure 580 (e.g., server function, routine, or subroutine) use different address spaces, the parameters used to perform the desired action (e.g., the parameters used to query the information from the database) must be converted so that these parameters may be sent in a message to the server device 110 and used by the server procedure 580. That is, the stub generally performs the conversion of the parameters so that the RPC looks like a local procedure call for calling the server procedure 580 on the remote server device 110.

Thus, in the embodiment of the RPC architecture shown in FIG. 5, the local stub 520 retrieves the required parameters from the client address space, translates the parameters as needed into a standard format for transmission (e.g., into the variable length serialized payload protocol 350), and calls the appropriate functions in the RPC client runtime library 530 to send the request (e.g., the message 400) to the remote server device 110. That is, for the example, the local stub procedure 520 retrieves the parameters need to query the information from the database and formats the parameters into a message 400 (along with the appropriate header 410) to be transmitted via the variable length serialized payload protocol 350 to the remote server device 110. In response, the appropriate functions in the RPC client run-time library 530 transmit the message 400 as RPC packets to the server device 110. This is accomplished by tunneling the message 400 through an established port (HTTP, for example) as the client transport 540.

In turn, the message 400 is received via the corresponding server transport 550. Once the message 400 is received, one or more functions of the server RPC run-time library 560 accept the message 400, initialize the server device 110 so that is can respond to the message 400, and call the server stub 570. In turn, the server stub 570 converts the parameters from the transmission format to the format needed by the server procedure 580 to execute the desired action (e.g., to query the desired information from the database). That is, in the example, the server stub 570 converts the serialized representation of the payload 460 in the message 400 to a format that the server procedure 580 can understand and execute. The server stub 570 calls the server procedure 580 and provides the parameters in the correct format. In response, the server procedure 580 performs the requested action and queries the needed information from the database based on the parameters.

Once finished, the server procedure 580 may return one or more generated parameters to the client procedure 510. That is, in the example, the server procedure 580 returns the queried information to the client device 120 using a similar sequence of steps as the steps taken to send the message 400 to the server device 110. The server procedure 580 returns the information to the server stub 570. The server stub 570 converts the information to the format required for transmission and returns the formatted message to the server runtime library 560. One or more functions of the runtime library 560 transmit the message 300 through a server transport 550 to the client device 120. The client device 120 completes the process by accepting the message 400 and returning the information in the message 300 to the client procedure 510 via the client transport 540, runtime library 530, and stub 520. In turn, the client procedure 510 returns the queried information from the database to the application that originally calls the procedure 510 residing on the client device 120. As a result, the application now has the needed information from the database to continue on with its normal operation.

Stub Module

Figure 6:
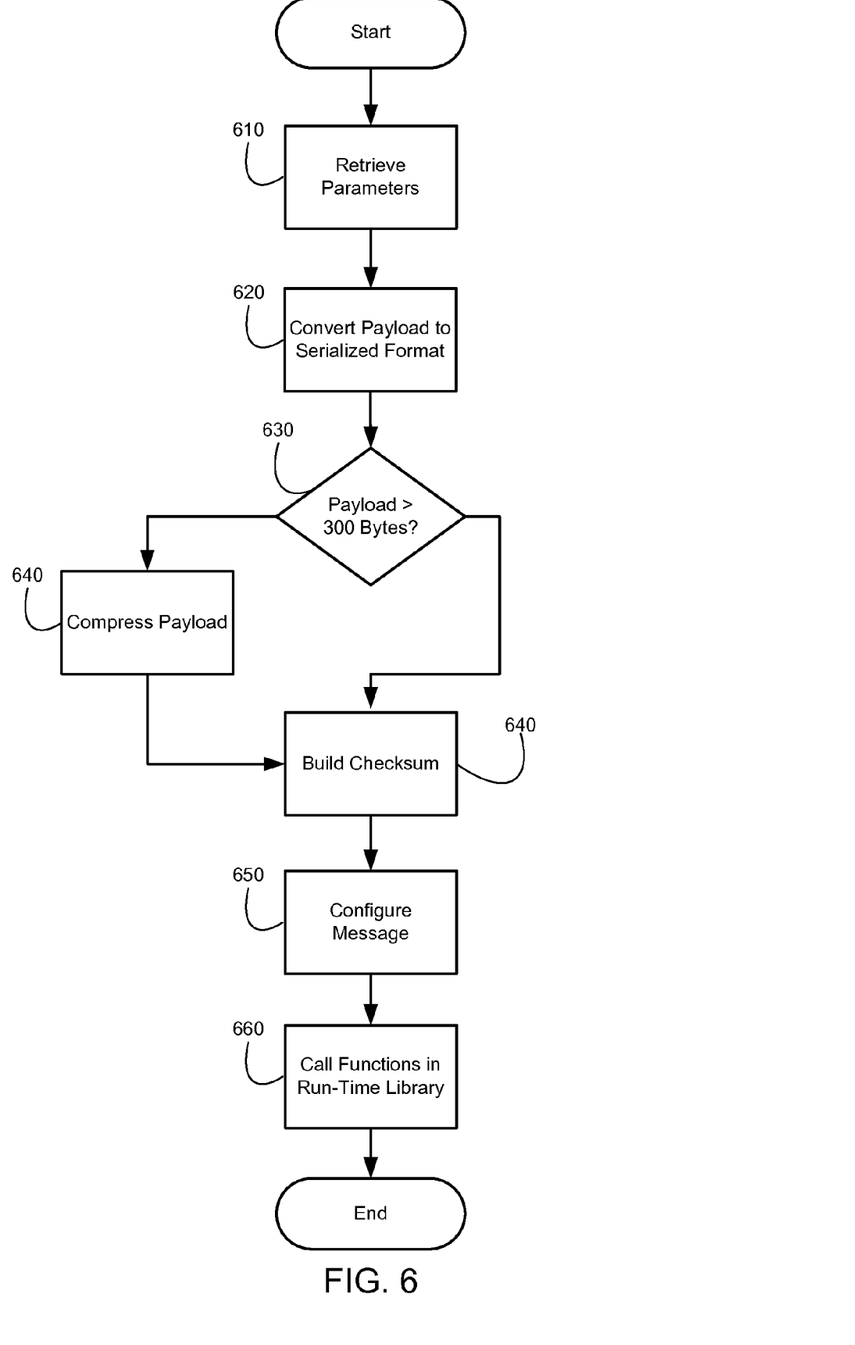
FIG. 6 is a flowchart illustrating a stub module that can be used in accordance with various embodiments of the present invention.

Turning now to FIG. 6, details are provided regarding the process flow for constructing the message 400 transmitted via the variable length serialized payload protocol 350. As previously mentioned, in various embodiments, the message 400 is comprised of a header 410 and a payload 460. In particular, FIG. 6 is a flow diagram showing a stub module for performing such functionality according to one embodiment of the invention. For example, the flow diagram shown in FIG. 6 may correspond to steps carried out by a processor in a computing device such as a server device 110 or client device 120, as it executes the stub module stored in the computing device's volatile and/or nonvolatile memory.

As mentioned, a stub module may be called whenever a RPC needs to be made to a remote device. For instance, as in the example provided above, a stub module may be called to send a RPC from a client device 120 to a server device 110 in order to query information from a remote database that is accessible to the server device 110. That is, an application running on the client device 110 may need a customer's telephone number so the application calls a function to query the number from the database. However, in this instance, since the client device 110 cannot access the database directly, the application does not call a function that executes code to directly query the database for the number but instead calls the stub module to make a RPC to the corresponding function on the server device 120 to query the database. Turning now to FIG. 6, in response the stub module retrieves the needed parameters for the RPC from a local address space in Step 610. That is, the stub module retrieves the parameters used by the remote procedure to query the telephone number. Depending on the embodiment, one of the retrieved parameters may identify the type of command being sent by the client device 120. For instance, in the example, the retrieved parameters may include a parameter that identifies that the RPC is a database query command. In particular embodiments, the command type may help the stub module to construct the appropriate RPC. In addition, in particular embodiments, this information may be used by the remote server device 120 to help identify the appropriate action to be taken in response to receiving the RPC from the client device 110.

In Step 620, the stub module converts the payload portion (e.g., the RPC with the appropriate parameters) of the message 400 into a serialized format. Depending on the embodiment, the payload may be configured in numerous ways. However, typically the payload is configured so that the RPC resembles a local procedure call on the remote server device 120. For instance, in the example, the RPC resembles a local procedure with the appropriate parameters that would be executed on the server device 120 to query the telephone number for the particular customer from the database. It is noted that in particular embodiments, the payload (e.g., command structure of the RPC) is free form and is not limited to a given layout. Thus, an advantage provided by various embodiments of the invention is that various forms and types of RPCs may be sent via the disclosed message structure and corresponding variable length serialized payload protocol 350.

Once the stub module has converted the payload into a serialized representation of the RPC, the stub module determines whether the serialized payload requires compression in Step 630. For instance, in particular embodiments, the stub module determines whether the uncompressed length of the serialized representation is greater than a predetermine size (e.g., greater than 300 bytes). If so, the stub module compresses the payload in Step 640. Depending on the embodiment, various compression algorithms may be employed by the stub module. For instance, in particular embodiments, the stub module may make use of gzip. While in other embodiments, the stub module may make use of the Lempel-Ziv-Markov chain algorithm (LZMA). Those of ordinary skill in the art can envision numerous algorithms that may be used to compress the payload in light of this disclosure.

Once the stub module has completed compressing the payload if required, the stub module builds a checksum to be used by the server device 120 to determine whether any data received has been corrupted in Step 640. Similar to the compression algorithm, those of ordinary skill in the art can envision numerous algorithms the may be used to build the checksum in light of this disclosure. For instance, in particular embodiments, the stub module may make use the MD5 message-digest algorithm to build the checksum. Specifically, in these particular embodiments, the stub module may use of the MD5 algorithm to hash the command type for the RPC, the uncompressed size of the JSON formatted payload, and the compressed size of the JSON formatted payload to build the checksum.

At this point, the stub module configures the message 400 in Step 650. For instance, in particular embodiments, the stub module configures the message 400 in the format as described above in FIG. 4. That is, the stub module configures the message 400 with a header 410 comprising a command header 420, a payload length header 430, a payload compressed length header 440, and a checksum header 450 and the serialized payload 460. As previously described, the command header 420 includes a value (e.g., integer) indicating the command type for the RPC, the payload length header 430 includes a value (e.g., integer) indicating the uncompressed size of the payload 460, the payload compressed length header 440 includes a value (e.g., integer) indicating the compressed size of the payload 460, and the checksum header 450 includes a value for the constructed checksum. Thus, the stub module configures message 400 by parsing these various header values and the payload 460 together.

Once the message has been configured, the stub module makes the appropriate function calls in the run-time library in Step 660 to send the message 400 using the variable length serialized payload protocol 350 to the remote server device 110. The server device 110 receives the message 400 and the stub module residing on the server device 110 performs similar functionality as described with respect to the stub module residing on the client device 120 in order to process the message 400 and execute the RPC. That is, the stub module on the server device 110 re-formats (e.g., deserializes) the payload 460 into the appropriate format for execution on the server device 110. As previously mentioned, since the payload was serialized, the programming language used on the client device 120 need not match the programming language on the server device 120. Once the stub module on the server device 110 has re-formatted the RPC into the appropriate format (note the server device 110 may make use of the other information provided in the header such as the command type and the size of the payload 460 compressed and uncompressed) and has confirmed none of the data received in the message is corrupted by using the checksum, the RPC is executed on the server device 110. Thus, in the example, the appropriate database is queried to obtain the desired telephone number.

Once the query has completed, the server device 110 invokes the stub module to send a response containing the telephone number in a similar fashion as the stub module on the client device 120 did to send the RPC. The client device 120 receives the response, re-formats the response to the appropriate format and returns the telephone number to the application residing on the client device 120 that had originally requested the telephone number. At this point, the application can continue to process accordingly once the application has the needed telephone number.

It is noted that the logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown FIG. 6 and described herein. These operations may also be performed in a different order than those described herein.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for generating a first remote procedure call message and a second remote procedure call message configured to be transmitted from a first device over a communication network to a remote second device and a remote third device, respectfully, the method comprising the steps of:

for the first remote procedure call message:
retrieving a first set of parameters from a local memory, the first set of parameters comprising one or more parameters needed to execute a first local procedure call in a first programming language on the remote second device and a parameter providing a first command type identifying a type of command the remote second device is to execute upon receiving the first remote procedure call message;

generating a command structure for the first local procedure call, the command structure comprising a first number of fields for the one or more parameters needed to execute the first local procedure call;

serializing the command structure to generate a serialized representation of the command structure; and generating the first remote procedure call message by a stub procedure residing on the first device combining together a first value for a command header field indicating the first command type, a second value for a payload length header field indicating an uncompressed size of the serialized representation of the command structure, a third value for a payload compressed length header field indicating a compressed size of the serialized representation of the command structure, a fourth value for a checksum header field configured to enable detection of corrupted data being received by the remote second device, and the serialized representation of the command structure for a payload field; and for the second remote procedure call message:
retrieving a second set of parameters from the local memory, the second set of parameters comprising one or more parameters needed to execute a second local procedure call in a second programming language on the remote third device and a parameter providing a second command type identifying a type of command the remote third device is to execute upon receiving the second remote procedure call message, wherein the second local procedure call is different than the first local procedure call and the second programming language is different than the first programming language;

generating the command structure for the second local procedure call, the command structure comprising a second number of fields for the one or more parameters needed to execute the second local procedure call, wherein the second number of fields for the one or more parameters needed to execute the second local procedure call is different than the first number of fields for the one or more parameters needed to execute the first local procedure call;

serializing the command structure to generate the serialized representation of the command structure; and generating the second remote procedure call message by the stub procedure residing on the first device combining together a fifth value for the command header field indicating the second command type, a sixth value for the payload length header field indicating the uncompressed size of the serialized representation of the command structure, a seventh value for the payload compressed length header field indicating the compressed size of the serialized representation of the command structure, an eighth value for the checksum header field configured to enable the detection of corrupted data being received by the remote third device, and the serialized representation of the command structure for the payload field, wherein the sixth value for the uncompressed size of the serialized representation of the command structure in the second remote procedure call message is different than the second value of the uncompressed size of the serialized representation of the command structure in the first remote procedure call message and the seventh value of the compressed size of the second serialized representation of the command structure in the second remote procedure call message is different than the third value of the compressed size of the serialized representation of the command structure in the first remote procedure call message.

2. The method of claim 1, wherein the serialized representation of the command structure comprises one of a JavaScript Object Notation representation of command structure or an Extendible Markup Language representation of the command structure.

3. The method of claim 1, wherein the communication network is configured with a protocol stack comprising a data link layer, a network layer, a transport layer, and an application layer, and the application layer comprises the remote procedure call message as a sub-layer.

4. The method of claim 3, wherein the protocol stack is one from the group consisting of a TCP/IP protocol stack, a UPD protocol stack, and an OSI protocol stack.

5. The method of claim 1 comprising the step of generating the fourth value for the checksum header field by hashing the first value for the command header field, the second value for the payload length header field, and the third value for the payload compressed length header field based on a MD5 message-digest algorithm.

6. The method of claim 1 comprising of the step of compressing the serialized representation of the command structure in response to the uncompressed size of the serialized representation of the command structure being greater than a predetermined size.

7. The method of claim 6, wherein the step of compressing the serialized representation of the command structure is accomplished using gzip or LZMA.

8. A non-transitory, computer-readable storage medium comprising computer-executable instructions for generating a first remote procedure call message and a second remote procedure call message configured to be transmitted from a first device over a communication network to a remote second device and a remote third device, respectfully, the computer-executable instructions when executed by at least one computer processor are configured to cause the at least one computer processor to:

for the first remote procedure call message:
retrieve a first set of parameters from a local memory, the first set of parameters comprising one or more parameters needed to execute a first local procedure call in a first programming language on the remote second device and a parameter providing a first command type identifying a type of command the remote second device is to execute upon receiving the first remote procedure call message;
generate a command structure for the first local procedure call, the command structure comprising a first number of fields for the one or more parameters needed to execute the first local procedure call;
serialize the command structure to generate a serialized representation of the command structure; and
generate the first remote procedure call message by combining together a first value for a command header field indicating the first command type, a second value for a payload length header field indicating an uncompressed size of the serialized representation of the command structure, a third value for a payload compressed length header field indicating a compressed size of the serialized representation of the command structure, a fourth value for a checksum header field configured to enable detection of corrupted data being received by the remote second device, and the serialized representation of the command structure for a payload field; and for the second remote procedure call message:
retrieve a second set of parameters from the local memory, the second set of parameters comprising one or more parameters needed to execute a second local procedure call in a second programming language on the remote third device and a parameter providing a second command type identifying a type of command the remote third device is to execute upon receiving the second remote procedure call message, wherein the second local procedure call is different than the first local procedure call and the second programming language is different than the first programming language;
generate the command structure for the second local procedure call, the command structure comprising a second number of fields for the one or more parameters needed to execute the second local procedure call, wherein the second number of fields for the one or more parameters needed to execute the second local procedure call is different than the first number of fields for the one or more parameters needed to execute the first local procedure call;
serialize the command structure to generate the serialized representation of the command structure; and
generate the second remote procedure call message by the stub procedure residing on the first device combining together a fifth value for the command header field indicating the second command type, a sixth value for the payload length header field indicating the uncompressed size of the serialized representation of the command structure, a seventh value for the payload compressed length header field indicating the compressed size of the serialized representation of the command structure, an eighth value for the checksum header field configured to enable the detection of corrupted data being received by the remote third device, and the serialized representation of the command structure for the payload field, wherein the sixth value for the uncompressed size of the serialized representation of the command structure in the second remote procedure call message is different than the second value of the uncompressed size of the serialized representation of the command structure in the first remote procedure call message and the seventh value of the compressed size of the second serialized representation of the command structure in the second remote procedure call message is different than the third value of the compressed size of the serialized representation of the command structure in the first remote procedure call message.

9. The non-transitory, computer-readable storage medium of claim 8, wherein the serialized representation of the command structure comprises one of a JavaScript Object Notation representation of the command structure or an Extendible Markup Language representation of the command structure.

10. The non-transitory, computer-readable storage medium of claim 8, wherein the communication network is configured with a protocol stack comprising a data link layer, a network layer, a transport layer, and an application layer, and the application layer comprises the remote procedure call message as a sub-layer.

11. The non-transitory, computer-readable storage medium of claim 10, wherein the protocol stack is one from the group consisting of a TCP/IP protocol stack, a UPD protocol stack, and an OSI protocol stack.

12. The non-transitory, computer-readable storage medium of claim 8, wherein the computer-executable instructions when executed by the at least one computer processor are configured to cause the at least one computer processor to generate the fourth value for the checksum header field by hashing the first value for the command header field, the second value for the payload length header field, and the third value for the payload compressed length header field based on a MD5 message-digest algorithm.

13. The non-transitory, computer-readable storage medium of claim 8, wherein the computer-executable instructions when executed by the at least one computer processor are configured to cause the at least one computer processor to compress the serialized representation of the command structure in response to the uncompressed size of the serialized representation of the command structure being greater than a predetermined size.

14. The non-transitory, computer-readable storage medium of claim 13, wherein the compressing of the serialized representation of the command structure is accomplished using gzip or LZMA.

15. A system for generating a first remote procedure call message and a second remote procedure call message configured to be transmitted from a first device over a communication network to a remote second device and a remote third device, respectfully, the system comprising:
at least one computer processor configured to:
for the second remote procedure call message:
retrieve a first set of parameters from a local memory, the first set of parameters comprising one or more parameters needed to execute a first local procedure call in a first programming language on the remote second device and a parameter providing a first command type identifying a type of command the remote second device is to execute upon receiving the first remote procedure call message;
generate a command structure for the first local procedure call, the command structure comprising a first number of fields for the one or more parameters needed to execute the first local procedure call;
serialize the command structure to generate a serialized representation of the command structure;
generate the first remote procedure call message by combining together a first value for a command header field indicating the first command type, a second value for a payload length header field indicating an uncompressed size of the serialized representation of the command structure, a third value for a payload compressed length header field indicating a compressed size of the serialized representation of the command structure, a fourth value for checksum header field configured to enable detection of corrupted data being received by the remote second device, and the serialized representation of the command structure for a payload field; and
for the second remote procedure call message:
retrieve a second set of parameters from the local memory, the second set of parameters comprising one or more parameters needed to execute a second local procedure call in a second programming language on the remote third device and a parameter providing a second command type identifying a type of command the remote third device is to execute upon receiving the second remote procedure call message, wherein the second local procedure call is different than the first local procedure call and the second programming language is different than the first programming language;
generate the command structure for the second local procedure call, the command structure comprising a second number of fields for the one or more parameters needed to execute the second local procedure call, wherein the second number of fields for the one or more parameters needed to execute the second local procedure call is different than the first number of fields for the one or more parameters needed to execute the first local procedure call;
serialize the command structure to generate the serialized representation of the command structure; and
generate the second remote procedure call message by the stub procedure residing on the first device combining together a fifth value for the command header field indicating the second command type, a sixth value for the payload length header field indicating the uncompressed size of the serialized representation of the command structure, a seventh value for the payload compressed length header field indicating the compressed size of the serialized representation of the command structure, an eighth value for the checksum header field configured to enable the detection of corrupted data being received by the remote third device, and the serialized representation of the command structure for the payload field, wherein the sixth value for the uncompressed size of the serialized representation of the command structure in the second remote procedure call message is different than the second value of the uncompressed size of the serialized representation of the command structure in the first remote procedure call message and the seventh value of the compressed size of the second serialized representation of the command structure in the second remote procedure call message is different than the third value of the compressed size of the serialized representation of the command structure in the first remote procedure call message.

16. The system of claim 15, wherein the serialized representation of the command structure comprises one of a JavaScript Object Notation representation of the command structure or an Extendible Markup Language representation of the command structure.

17. The system of claim 15, wherein the communication network is configured with a protocol stack comprising a data link layer, a network layer, a transport layer, and an application layer, and the application layer comprises the remote procedure call message as a sub-layer.

18. The system of claim 17, wherein the protocol stack is one from the group consisting of a TCP/IP protocol stack, a UPD protocol stack, and an OSI protocol stack.

19. The system of claim 15, wherein the at least one computer processor is configured to generate the fourth value for the checksum header field by hashing the first value for the command header field, the second value for the payload length header field, and the third value for the payload compressed length header field based on a MD5 message-digest algorithm.

20. The system of claim 15, wherein the at least one computer processor is configured to compress the serialized representation of the command structure in response to the uncompressed size of the serialized representation of the command structure being greater than a predetermined size.

21. The system of claim 20, wherein the compressing of the serialized representation of the command structure is accomplished using gzip or LZMA.

22. The method of claim 1 comprising of the steps of:
transmitting the first remote procedure call message to the remote second device so that the serialized representation of the command structure found in the first remote procedure call message can be deserialized based on at least one of the first value in the command header field, the second value in the payload length header field, and the third value in the payload compressed length header field into a first format appropriate to enable the remote second device to execute the first local procedure call in the first programming language using the one or more parameters found in the first number of fields of the command structure; and
transmitting the second remote procedure call message to the remote third device so that the serialized representation of the command structure found in the second remote procedure call message can be deserialized based on at least one of the fifth value in the command header field, the sixth value in the payload length header field, and the seventh value in the payload compressed length header field into a second format appropriate to enable the remote third device to execute the second local procedure call in the second programming language using the one or more parameters found in the second number of fields of the command structure.

23. The non-transitory, computer-readable storage medium of claim 8, wherein the computer-executable instructions when executed by the at least one computer processor are configured to cause the at least one computer processor to:
transmit the first remote procedure call message to the remote second device so that the serialized representation of the command structure found in the first remote procedure call message can be deserialized based on at least one of the first value in the command header field, the second value in the payload length header field, and the third value in the payload compressed length header field into a first format appropriate to enable the remote second device to execute the first local procedure call in the first programming language using the one or more parameters found in the first number of fields of the command structure; and
transmit the second remote procedure call message to the remote third device so that the serialized representation of the command structure found in the second remote procedure call message can be deserialized based on at least one of the fifth value in the command header field, the sixth value in the payload length header field, and the seventh value in the payload compressed length header field into a second format appropriate to enable the remote third device to execute the second local procedure call in the second programming language using the one or more parameters found in the second number of fields of the command structure.

24. The system of claim 15, wherein the at least one computer processor is configured to:
transmit the first remote procedure call message to the remote second device so that the serialized representation of the command structure found in the first remote procedure call message can be deserialized based on at least one of the first value in the command header field, the second value in the payload length header field, and the third value in the payload compressed length header field into a first format appropriate to enable the remote second device to execute the first local procedure call in the first programming language using the one or more parameters found in the first number of fields of the command structure; and
transmit the second remote procedure call message to the remote third device so that the serialized representation of the command structure found in the second remote procedure call message can be deserialized based on at least one of the fifth value in the command header field, the sixth value in the payload length header field, and the seventh value in the payload compressed length header field into a second format appropriate to enable the remote third device to execute the second local procedure call in the second programming language using the one or more parameters found in the second number of fields of the command structure.

\* \* \* \* \*